US009434386B2

(12) United States Patent
Nedorezov et al.

(10) Patent No.: US 9,434,386 B2
(45) Date of Patent: Sep. 6, 2016

(54) METHOD FOR OPERATING A VEHICLE POWERTRAIN

(71) Applicant: Ford Global Technologies, LLC, Dearborn, MI (US)

(72) Inventors: Felix Nedorezov, Rochester Hills, MI (US); Hong Jiang, Birmingham, MI (US); Alex O'Connor Gibson, Ann Arbor, MI (US); Matthew John Shelton, Grosse Ile, MI (US); Roger Lyle Huffmaster, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/603,237

(22) Filed: Jan. 22, 2015

(65) Prior Publication Data

US 2015/0151763 A1    Jun. 4, 2015

Related U.S. Application Data

(62) Division of application No. 13/413,085, filed on Mar. 6, 2012, now Pat. No. 8,989,978.

(51) Int. Cl.
*B60W 30/192* (2012.01)
*B60W 10/02* (2006.01)
*B60W 10/06* (2006.01)
(Continued)

(52) U.S. Cl.
CPC ............ *B60W 30/192* (2013.01); *B60W 10/02* (2013.01); *B60W 10/06* (2013.01); *B60W 30/186* (2013.01); *B60W 30/18018* (2013.01); *F16D 28/00* (2013.01); *F16D 48/08* (2013.01); *B60W 2510/244* (2013.01); *B60W 2510/246* (2013.01); *B60W 2550/12* (2013.01);
*B60W 2710/022* (2013.01); *F16D 21/06* (2013.01); *F16D 2023/126* (2013.01); *F16D 2500/3026* (2013.01); *F16D 2500/3064* (2013.01); *F16D 2500/3067* (2013.01); *F16D 2500/316* (2013.01); *F16D 2500/3161* (2013.01);
(Continued)

(58) Field of Classification Search
CPC .. B60W 30/192; B60W 10/02; B60W 10/06; B60W 30/18018; B60W 30/186; F16D 28/00; F16D 48/08
See application file for complete search history.

(56) References Cited

U.S. PATENT DOCUMENTS

| 4,169,450 A | 10/1979 | Tanaka et al. |
| 4,259,930 A | 4/1981 | Hofbauer |

(Continued)

FOREIGN PATENT DOCUMENTS

CN    101769208 A    7/2010

OTHER PUBLICATIONS

Anonymous, "Dual Clutch Powershift Life Analysis Process," IPCOM No. 000143581, Published Nov. 29, 2006, 3 pages.

(Continued)

*Primary Examiner* — Nicholas Kiswanto
(74) *Attorney, Agent, or Firm* — Julia Voutyras; Alleman Hall McCoy Russell & Tuttle LLP

(57) ABSTRACT

Methods and systems for controlling a vehicle powertrain that may be automatically stopped and started are presented. In one example, a method adjusts a position of a transmission clutch in response to battery current during engine cranking. The method may reduce clutch wear and improve vehicle launch from a stop.

6 Claims, 6 Drawing Sheets

(51) Int. Cl.
   *B60W 30/18* (2012.01)
   *F16D 28/00* (2006.01)
   *F16D 48/08* (2006.01)
   *B60W 30/186* (2012.01)
   *F16D 21/06* (2006.01)
   *F16D 23/12* (2006.01)

(52) U.S. Cl.
   CPC ............ *Y10T 477/70* (2015.01); *Y10T 477/75* (2015.01); *Y10T 477/76* (2015.01)

(56) References Cited

U.S. PATENT DOCUMENTS

| | | | |
|---|---|---|---|
| 4,918,323 A | 4/1990 | Aso | |
| 5,083,273 A | 1/1992 | Nishiwaki et al. | |
| 5,270,623 A | 12/1993 | Ohta et al. | |
| 6,018,198 A | 1/2000 | Tsuzuki et al. | |
| 6,341,584 B1 * | 1/2002 | Itoyama | B60K 6/48 123/179.16 |
| 6,443,277 B1 | 9/2002 | Taylor et al. | |
| 6,763,903 B2 | 7/2004 | Morimoto et al. | |
| 6,853,892 B2 | 2/2005 | Baraszu et al. | |
| 6,962,224 B2 | 11/2005 | Nakanowatari | |
| 7,094,176 B2 | 8/2006 | Budal et al. | |
| 7,414,327 B2 | 8/2008 | Kusumoto et al. | |
| 7,476,176 B2 | 1/2009 | Ibamoto et al. | |
| 7,488,272 B2 | 2/2009 | Bothe et al. | |
| 7,678,020 B2 * | 3/2010 | Matsumura | F16D 28/00 477/174 |
| 8,374,760 B2 | 2/2013 | Snyder et al. | |
| 8,476,777 B2 | 7/2013 | Usami et al. | |
| 8,579,759 B2 * | 11/2013 | Akebono | B60W 10/02 180/65.285 |
| 8,610,296 B2 | 12/2013 | Usami et al. | |
| 2006/0241851 A1 | 10/2006 | Berger | |
| 2007/0157899 A1 | 7/2007 | Seufert et al. | |
| 2007/0255477 A1 | 11/2007 | Okuda et al. | |
| 2007/0261901 A1 | 11/2007 | Janson et al. | |
| 2009/0064806 A1 | 3/2009 | Hirabayashi | |
| 2009/0254258 A1 | 10/2009 | Ishikawa et al. | |
| 2010/0174460 A1 | 7/2010 | Gibson et al. | |
| 2010/0197450 A1 | 8/2010 | Mittelberger et al. | |
| 2011/0301796 A1 | 12/2011 | Ohashi et al. | |
| 2012/0065022 A1 | 3/2012 | Ohashi et al. | |
| 2012/0067685 A1 | 3/2012 | Ohashi et al. | |
| 2012/0290151 A1 * | 11/2012 | Bissontz | B60W 10/06 701/2 |
| 2012/0319634 A1 | 12/2012 | McGrogan et al. | |
| 2013/0042832 A1 | 2/2013 | Park et al. | |

OTHER PUBLICATIONS

Partial Translation of Office Action of Chinese Application No. 2013100706744, Issued Apr. 20, 2016, State Intellectual Property Office of PRC, 8 Pages.

* cited by examiner

METHOD FOR OPERATING A VEHICLE POWERTRAIN

CROSS REFERENCE TO RELATED APPLICATIONS

The present application is a divisional of U.S. patent application Ser. No. 13/413,085, entitled "METHOD FOR OPERATING A VEHICLE POWERTRAIN," filed on Mar. 6, 2012, the entire contents of which are hereby incorporated by reference for all purposes.

FIELD

The present description relates to methods and systems for controlling an engine that may be automatically stopped and started. The methods and systems may be particularly useful during conditions to reduce clutch wear and improve vehicle launch after an automatic engine start.

BACKGROUND AND SUMMARY

An engine of a vehicle may be automatically stopped during selected operating conditions to conserve fuel. The engine may be subsequently automatically restarted when operating conditions change, when a brake pedal is released for example. A transmission may also be coupled to the engine to deliver torque from the engine to vehicle wheels. In some examples, the transmission may be an automatic transmission that includes few or no direct operator inputs to directly adjust the operating state of the transmission. In other words, the operator may not be able to manually control transmission clutches and gears. Instead, transmission clutches and gears may be adjusted by a controller that accepts inputs from the operator and ancillary sensors. If the transmission is controlled in an undesirable manner during automatic engine stops and starts, the transmission may degrade at a rate that is higher than is desired.

The inventors herein have recognized the above-mentioned disadvantages and have developed a method for operating a vehicle powertrain, comprising: adjusting a position of a clutch of a transmission in response to a battery current during cranking of an engine while starting the engine.

By adjusting a position of a clutch in response to battery current during cranking of an engine while starting the engine, it may be possible to reduce transmission degradation and improve vehicle launch during automatic engine stops and starts. Specifically, battery current may be sensed during engine cranking and compared to a threshold current. If the battery current is greater than the threshold current, then the force being applied by the clutch may be reduced. On the other hand, if less than a desired amount of engine torque is transferred through the transmission during engine cranking, then force applied by the clutch may be increased to improve vehicle launch.

The present description may provide several advantages. For example, the approach may reduce transmission degradation. Further, the approach may improve vehicle launch by reducing lag time between when the engine is started and when engine torque is delivered to vehicle wheels. In addition, the approach may improve battery life via reducing current draw from the battery during engine cranking.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example, referred to herein as the Detailed Description, when taken alone or with reference to the drawings, where.

DETAILED DESCRIPTION

Figure 1:
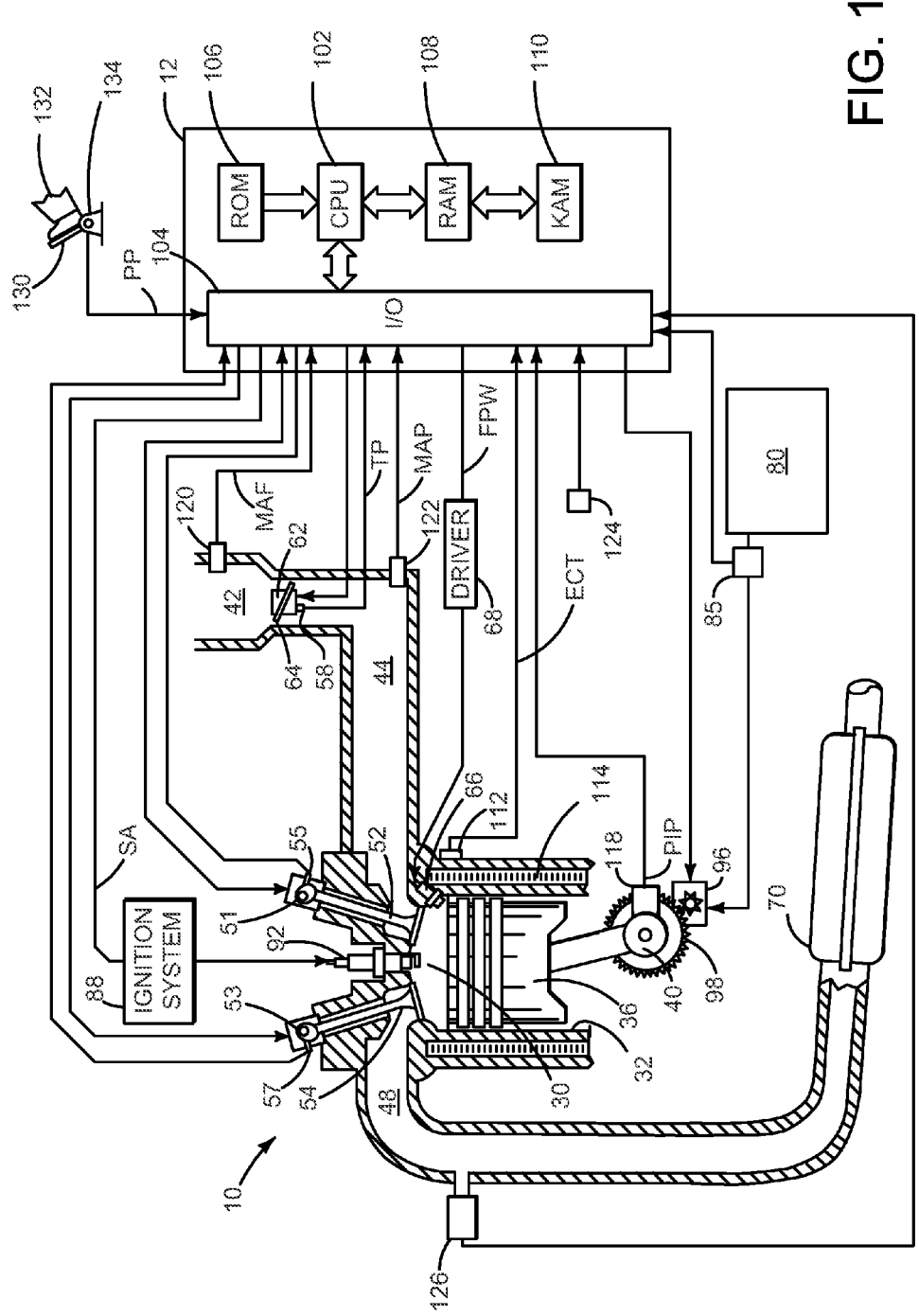
FIG. 1 is a schematic diagram of an engine.
Figure 2:
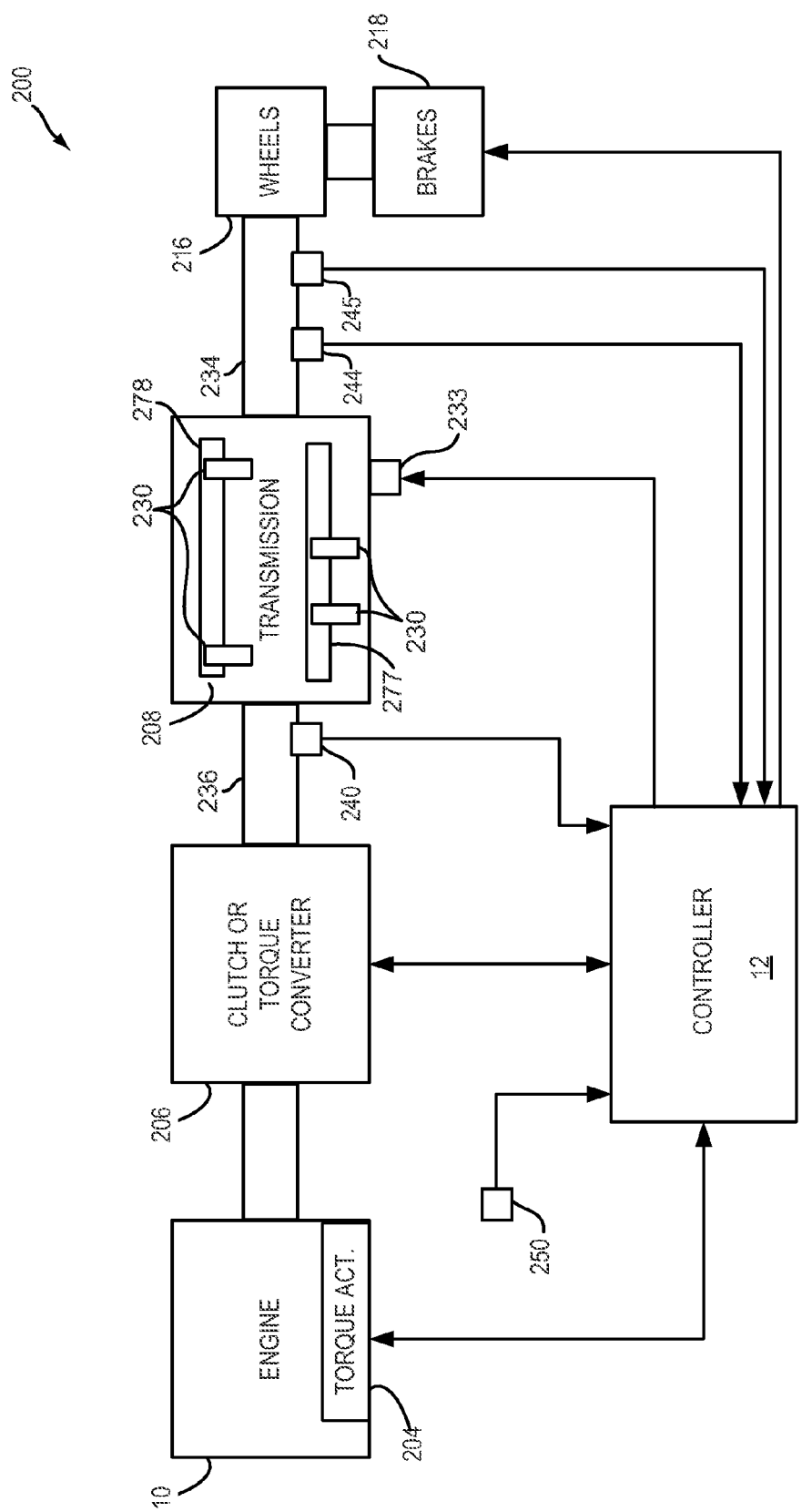
FIG. 2 is shows an example powertrain system layout.

The present description is related to controlling a vehicle powertrain during engine stopping and starting. In one non-limiting example, transmission clutches may be adjusted in response to current supplied from a battery during engine cranking. The vehicle powertrain may include an engine as illustrated in FIG. 1. Further, the engine may be part of a vehicle powertrain as illustrated in FIG. 2.

Figure 3:
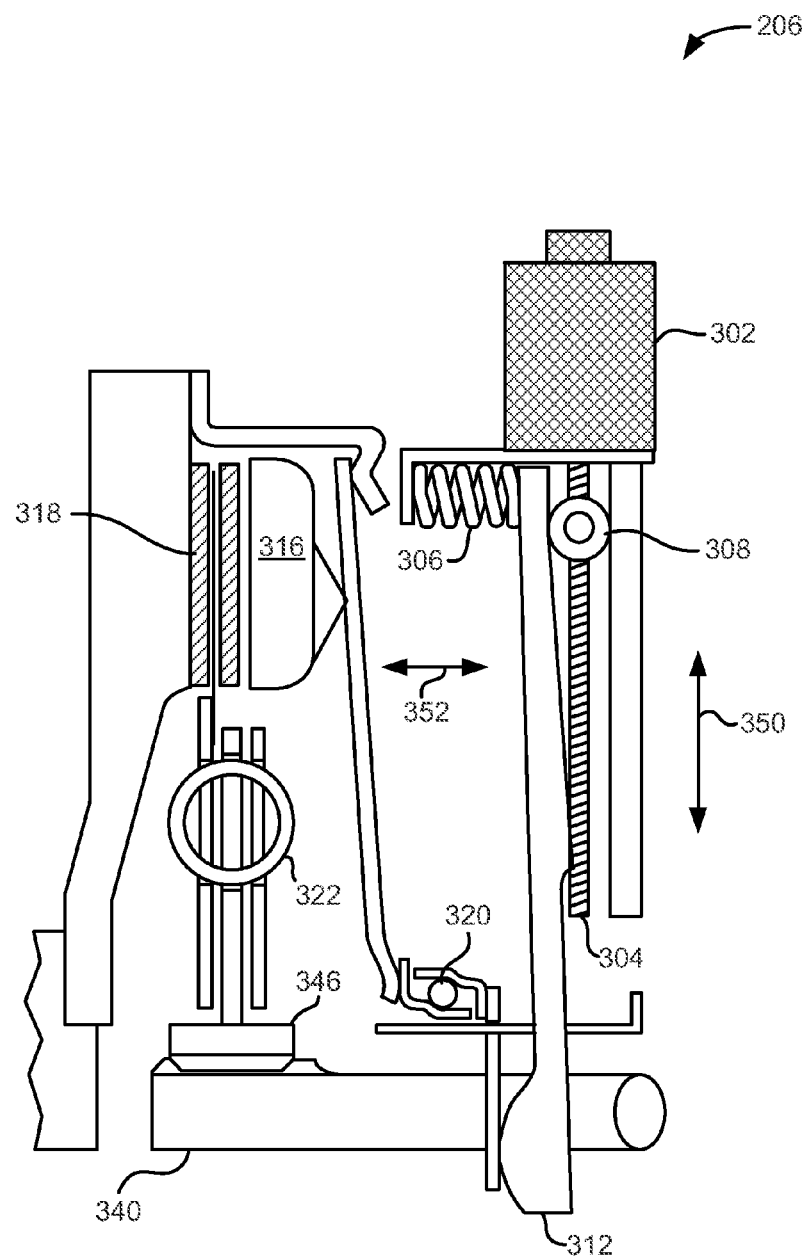
FIGS. 3-4 are example schematic diagrams of transmission clutches.
Figure 4:
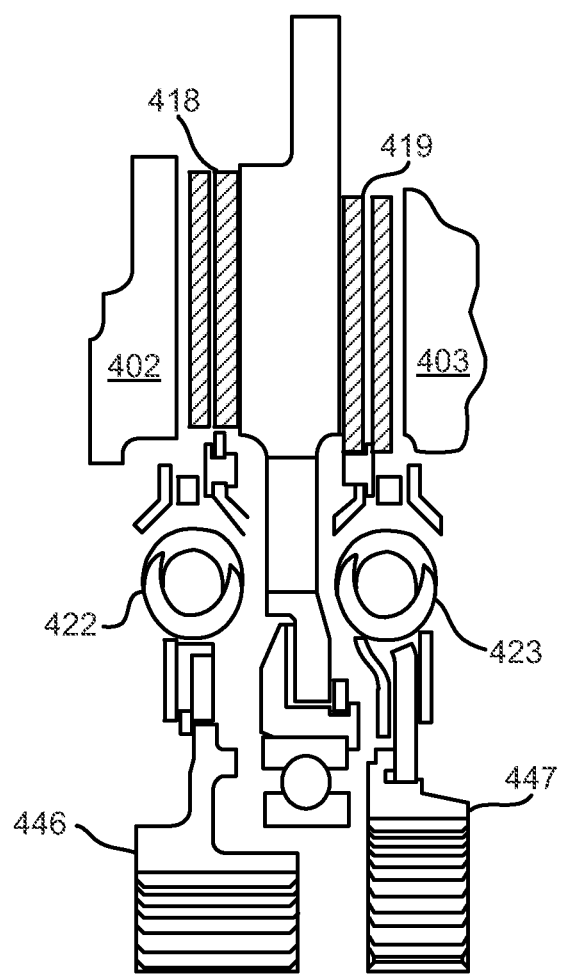
Figure 5:
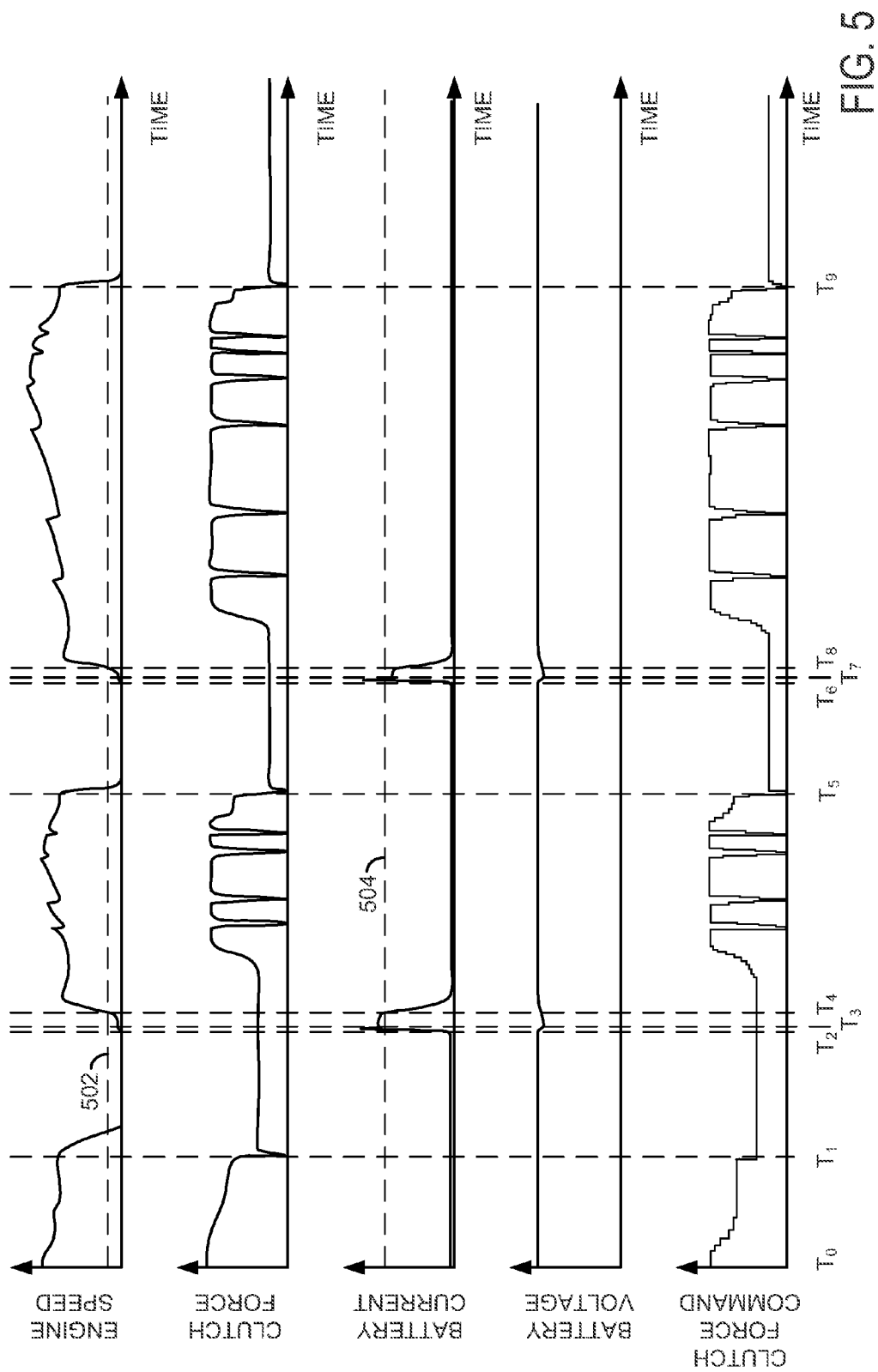
FIG. 5 is a plot of an example engine operating sequence.
Figure 6:
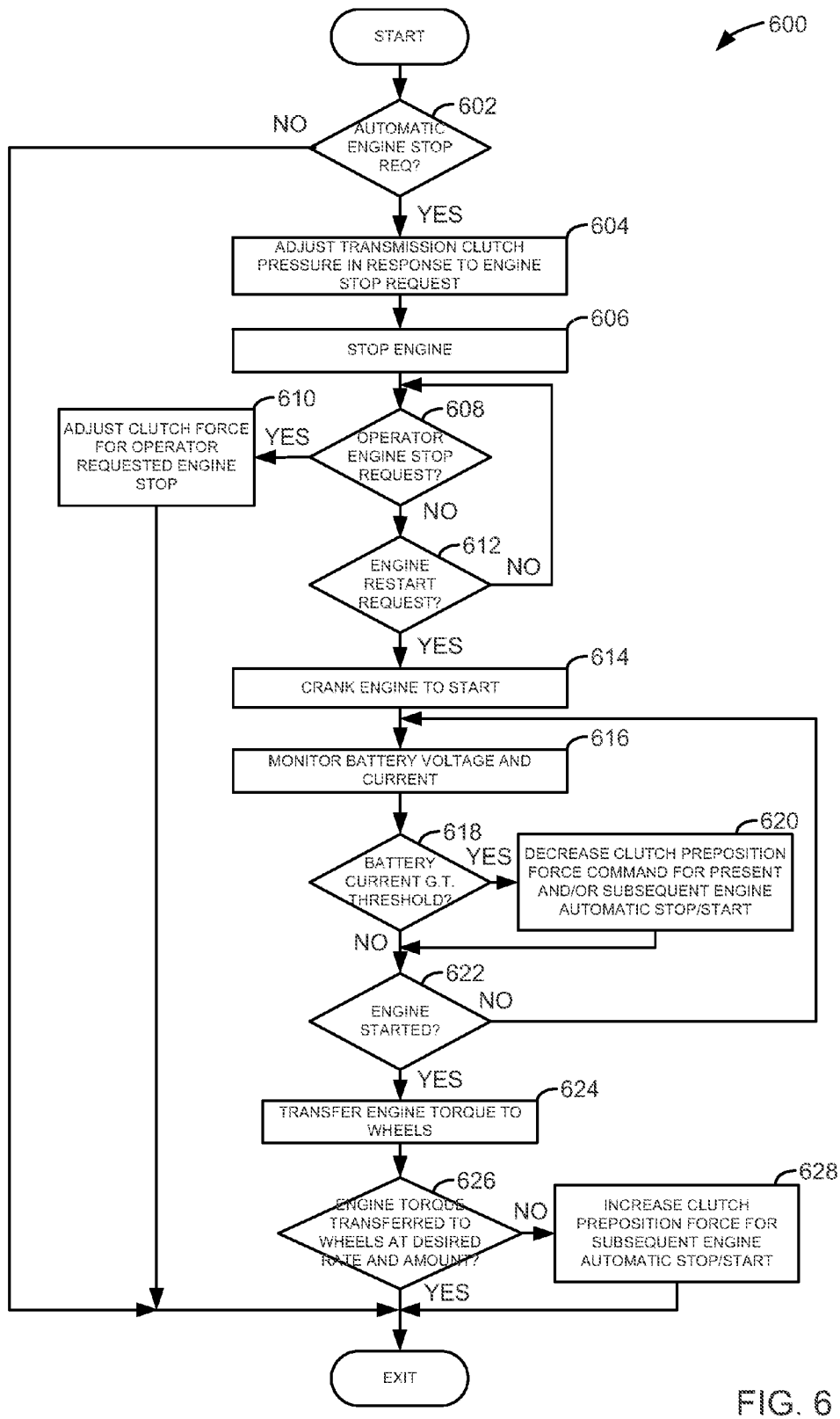
FIG. 6 is a flowchart of an example powertrain control method.

FIGS. 3 and 4 show example automatic transmission clutches. In one example, the clutches may be electrically actuated. However, in other examples the clutches may be hydraulically actuated. FIG. 5 shows an example operating sequence when the method of FIG. 6 is executed via a controller as shown in FIGS. 1 and 2.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. Alternatively, one or more of the intake and exhaust valves may be operated by an electromechanically controlled valve coil and armature assembly. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail (not shown). Fuel injector 66 is supplied operating current from driver 68 which responds to controller 12. In addition, intake manifold 44 is shown communicating with optional electronic air inlet throttle 62 which adjusts a position of air inlet throttle plate 64 to control air flow from air intake 42 to intake manifold 44. In one example, a high pressure, dual stage, fuel system may be used to generate higher fuel pressures.

Ignition coil 88 provides an ignition spark to combustion chamber 30 via spark plug 92 in response to a signal from controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Engine starter 96 may selectively engage flywheel 98 which is coupled to crankshaft 40 to rotate crankshaft 40. Engine starter 96 may be engaged via a signal from controller 12. In some examples, engine starter 96 may be engaged without input from a driver dedicated engine stop/start command input (e.g., a key switch or pushbutton). Rather, engine starter 96 may be engaged when a driver releases a brake pedal or depresses accelerator pedal 130 (e.g., an input device that does not have a sole purpose of stopping and/or starting the engine). In this way, engine 10 may be automatically started via engine starter 96 to conserve fuel. Starter 96 is supplied current via battery 80. Current flowing from or into battery 80 is sensed via shunt resistor 85. Alternatively, element 85 may be a coil for sensing battery current.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; barometric pressure from sensor 124; and a measurement of air inlet throttle position from sensor 58. In a preferred aspect of the present description, engine position sensor 118 produces a predetermined number of equally spaced pulses every revolution of the crankshaft from which engine speed (RPM) can be determined.

In some examples, the engine may be coupled to an electric motor/battery system in a hybrid vehicle. The hybrid vehicle may have a parallel configuration, series configuration, or variation or combinations thereof. Further, in some examples, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle powertrain 200. Powertrain 200 may be powered by engine 10. Engine 10 may be started with an engine starting system (as shown in FIG. 1). Further, engine 10 may generate or adjust torque via torque actuator 204, such as a fuel injector, air inlet throttle, etc.

An engine output torque may be transmitted to clutch 206 to drive an automatic transmission 208 via transmission input shaft 236. Clutch 206 may be comprised of one or more sets of clutch discs and one or more pressure plates as shown in FIGS. 3 and 4. Further, one or more gears 230 coupled to first layshaft 278 or second layshaft 277 may be selectively engaged to propel a vehicle. In one example, the clutch 206 may be referred to as a component of the transmission. The position of clutch 206 may be adjusted to vary force applied by clutch 206 to couple engine 10 to automatic transmission 208. Clutch 206 may be electrically or hydraulically actuated.

Torque output from the automatic transmission 208 may in turn be relayed to wheels 216 to propel the vehicle via transmission output shaft 234. Specifically, automatic transmission 208 may transfer an input driving torque at the input shaft 236 responsive to a vehicle traveling condition before transmitting an output driving torque to the wheels.

Further, a frictional force may be applied to wheels 216 by engaging wheel brakes 218. In one example, wheel brakes 218 may be engaged in response to the driver pressing his foot on a brake pedal (not shown). In the same way, a frictional force may be reduced to wheels 216 by disengaging wheel brakes 218 in response to the driver releasing his foot from a brake pedal. Further, vehicle brakes may apply a frictional force to wheels 216 as part of an automated engine stopping procedure.

Gear clutches 230 may be selectively applied via gear actuator 233. Gear actuator 233 may be electrically or hydraulically operated. Clutch 206 may be set to an open state when gear actuator 233 shifts between different gear ratios.

Transmission input speed may be monitored via transmission input shaft speed sensor 240. Transmission output speed may be monitored via transmission output shaft speed sensor 244. In some examples, accelerometer 250 may provide vehicle acceleration data to controller 12 so that clutch 206 may be controlled (e.g., increase or decrease clutch apply pressure and adjust clutch engagement timing) via controller 12 during engine starting and vehicle launch.

In some examples, torque transmitted through transmission 208 may be determined via a torque sensor 245.

A controller 12 may be configured to receive inputs from engine 10, as shown in more detail in FIG. 1, and accordingly control a torque output of the engine and/or operation of the torque converter, transmission, clutches, and/or brakes. As one example, a torque output may be controlled by adjusting a combination of spark timing, fuel pulse width, fuel pulse timing, and/or air charge, by controlling air inlet throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output.

When idle-stop conditions are satisfied, controller 12 may initiate engine shutdown by shutting off fuel and spark to the engine. Further, to maintain an amount of torsion in the transmission, the controller may control the force applied by clutch 206 so that the engine 10 is at least partially engaged to vehicle wheels 216.

A wheel brake pressure may also be adjusted during the engine shutdown to limit vehicle movement during an engine shutdown. In one example, the wheel brake pressure may be adjusted to coordinate the application of the wheel brakes with the adjusting force applied by clutch 206 to couple engine 10 with transmission 208. As such, by adjusting the wheel brake pressure and the clutch application force, the amount of torsion retained in the transmission when the engine is shutdown may be adjusted.

When engine restart conditions are satisfied, and/or a vehicle operator wants to launch the vehicle, controller 12 may reactivate the engine by cranking or rotating the engine and resuming cylinder combustion. To launch the vehicle, application force of clutch 206 may be ramped up or increased and the wheel brakes 218 may be released to increase torque to the driving wheels 216.

Thus, the system of FIGS. 1 and 2 provides for a system for controlling an engine, comprising: an engine; a transmission including an electrically actuated clutch; and a controller including executable instructions stored in a non-transitory medium to automatically cease combustion in a cylinder of the engine and adjust the electrically actuated clutch in response to a request to stop the engine, and instructions to adjust a position, or pressure, or force, or torque, or capacity, of the electrically actuated clutch in response to a battery current during engine cranking while the engine is being started. The system includes additional instructions to further adjust the position, or pressure, or force, or torque, or capacity, of the electrically actuated clutch in response to a request to restart the engine before the engine stops in response to the request to stop the engine. The system includes where the position of the electrically actuated clutch is opened to reduce force applied by the electrically actuated clutch in response to the request to restart the engine.

In some examples, the system also includes additional instructions to adjust the position of the electrically actuated clutch in response to the battery current when the engine is at cranking speed and not to adjust the position of the electrically actuated clutch in response to battery current when the engine is at a speed that is different from cranking speed by more than a threshold amount. The system includes where the controller includes further instructions to adjust the position of the clutch during engine cranking in response to an amount of torque output by the transmission during engine cranking.

Referring now to FIG. 3 an example clutch 206 is shown. Clutch 206 includes friction discs 318 which apply force to transfer torque to shaft 340 via spline 346. Damper spring 322 reduces oscillations through the transmission when force is applied to friction discs 318. Electric motor 302 rotates screw 304 and causes roller 308 to move linearly in the directions of arrows 350. Roller 308 acts on lever 312 to adjust the position of pressure plate 316 as indicated by arrows 352. Return spring 306 applies force opposing the force applied by electric motor 302 to lever 312 via roller 308. In this way, return spring 306 releases pressure plate 316 from applying force to friction discs 318 when roller 308 is in the position shown. Lever 312 transfers force from electric motor 302 to pressure plate 316 via engagement bearing 320.

Referring now to FIG. 4, an alternative example clutch 206 that includes two sets of friction discs and two pressure plates is shown. The clutches shown in FIG. 4 may be applied and released via an electrical actuator similar to that shown in FIG. 3.

In this example, clutch 206 includes a first set of friction discs 418 and a second set of friction discs 419. Engine torque is transferred from the engine to first spline 446 when first pressure plate 402 applies force to the first set of friction discs 418. In one example, first spline 446 transfers engine torque to a first layshaft. Similarly, engine torque is transferred from the engine to second spline 447 when second pressure plate 403 applies force to the second set of friction discs 419. Damper springs 422 and 423 limit oscillations through the transmission when engine torque is transferred to splines 446 and 447 respectively.

Referring now to FIG. 5, a sequence showing example operation of the method of FIG. 6 in the system of FIGS. 1 and 2 executed via instructions stored in non-transitory memory of controller 12. Vertical markers at times $T_0$-$T_7$ indicate particular areas of interest during the sequence.

The first plot from the top of FIG. 5 is a plot of engine speed versus time. The X axis represents time and time increases from the left side of the figure to right side of the figure. The Y axis represents engine speed and engine speed increases in the direction of the Y axis arrow.

The second plot from the top of FIG. 5 represents transmission clutch application force. The X axis represents time and time increases from the left side of the figure to right side of the figure. The Y axis represents engine speed and engine speed increases in the direction of the Y axis arrow.

The third plot from the top of FIG. 5 represents battery current. The X axis represents time and time increase from the left side of the figure to the right side of the figure. The Y axis represents battery current and battery current increases in the direction of the Y axis arrow.

The fourth plot from the top of FIG. 5 represents battery voltage. The X axis represents time and time increases from the left side of the figure to the right side of the figure. The Y axis represents battery voltage and battery voltage increases in the direction of the Y axis arrow.

The fifth plot from the top of FIG. 5 represents the clutch force command. The X axis represents time and time increases from the left side of the figure to the right side of the figure. The Y axis represents the clutch force command and the clutch force command increase clutch application force in the direction of the Y axis arrow.

At time $T_0$, engine speed is being reduced and clutch force is relatively high as vehicle speed decreases. Battery current is low since few accessories are being powered. The battery voltage is high since the battery is charged and since current demand is low. The clutch force command is high to fully engaging the clutch.

Between time $T_0$ and time $T_1$, engine speed continues to be reduced and clutch force is reduced and vehicle speed approaches zero. The battery voltage remains high and the battery current remains low. The clutch force command is reduced to reduce clutch application pressure.

At time $T_1$, an automatic engine stop request is issued to stop the engine. Since the engine is rotating, hydraulic pressure or electric current may be applied to the clutch to adjust the clutch force. The clutch force command is reduced to a predetermined level to preposition the clutch for a subsequent engine start. The clutch force decreases as the clutch force command is decreased. The clutch force preposition is based on a clutch position as determined from a previous engine start as discussed in more detail below. The battery voltage remains high and the battery current remains low. Fuel and spark are deactivated and the engine stops rotating.

At time $T_2$, a request to automatically start the engine is issued. The clutch command and the clutch force remain at the preposition level set at the engine stop. The engine starter is engaged and the engine begins to rotate. The battery current increases as the starter engages, but in one example no adjustments are made to the clutch engagement in response to the battery current when the starter is first engage. Rather, adjustments to clutch position are made based upon when the engine reaches cranking speed. In one example the engine reaches cranking speed when engine speed reaches a threshold engine speed. 250 RPM for example. Engine cranking speed may vary as compression work of the engine increases and decreases during cranking. Thus, engine cranking speed may vary between 200 and 300 RPM for example. However, clutch engagement force is not adjusted in response to engine speeds outside the cranking speed. For example, clutch engagement force is not adjusted based on battery current when engine speed is between 0 and 150 RPM. Further, clutch engagement force is not adjusted based on battery current after engine speed exceeds a threshold engine speed, 350 RPM for example.

At time $T_3$, engine speed is at cranking speed. Therefore battery current is monitored and engine operating parameters are adjusted in response to battery current after engine speed reaches a threshold engine speed. In one example, engine cranking speed is the speed that the engine rotates when the starter is engaged for a predetermine amount of time at nominal battery voltage when no combustion is present. The batter voltage decreases somewhat but remains at a high level indicating a good battery. In cases where the battery voltage is reduced to less than a threshold voltage, clutch force is not adjusted in response to battery current. In this example, the battery current exceeds predetermined threshold At time $T_4$, engine speed exceeds engine cranking speed and threshold speed 502 which indicates the engine is started and then battery voltage and current are not used as a basis for adjusting clutch application pressure. The engine speed accelerates toward idle speed and the battery current decreases. The battery voltage rises as the current demand falls. The clutch force command remains constant as the engine accelerates.

Between time $T_4$ and time $T_5$ the clutch force command is ramped up in response to an increasing engine torque demand from the operator. The engine speed also increases as the operator increases the torque demand to accelerate the vehicle. The clutch force and clutch force command are shown being reduced several times. The clutch force is reduced when gears of the transmission are shifted. The engine speed increases and decreases as the transmission is shifted. The engine speed decreases with vehicle speed as time $T_5$ is approached.

At time $T_5$, the vehicle and engine reaches conditions for automatically stopping the engine (e.g., engine at idle speed, zero vehicle speed, and brake pedal depressed) and the engine is automatically stopped. Before the engine is stopped, the clutch is prepositioned for engine starting by adjusting the clutch force command. In one example, the clutch application force is decremented from a previous setting during automatic engine stopping in response to the battery current greater than a threshold as shown between times $T_3$ and $T_4$. Thus, at time $T_5$ clutch force is less than clutch force at time $T_1$ because battery current exceeded the threshold 504 at time $T_3$. In some examples, the clutch force may be adjusted at the time the battery current is monitored when battery current is greater than the threshold. Engine speed is reduced to zero and battery current is at a low level.

At time $T_6$, a command to automatically restart the engine is issued and the engine is cranked over. In one example, the engine is cranked via a starter with a pinion that engages a flywheel and rotates the engine. In other examples, the engine may be rotated by an electric motor that is coupled to the engine.

At time $T_7$, the engine reaches cranking speed and battery current is monitored. Since battery current is less than threshold 504, battery current is not adjusted. The battery voltage is at a relatively high level and the clutch command remains at the adjusted level which is less than the level applied during the last engine start at time $T_2$.

At time $T_8$, the engine speed exceeds the threshold engine speed 502 and so battery current is no longer monitored. The vehicle accelerates as desired so the clutch application force is not increased during preposition in a subsequent engine restart. The engine speed increases with increasing torque demand and the transmission is shifted several times between time $T_8$ and time $T_9$. Another automatic engine stop request is issued at time $T_9$. The clutch position is adjusted to the same preposition as the preposition at time $T_5$ since the battery current during the previous engine start was below threshold level 504.

Referring now to FIG. 6, a method for an example powertrain control is shown. The method of FIG. 6 may be executed by the system shown in FIGS. 1 and 2 executing instructions stored in non-transitory memory. The method of FIG. 6 may provide the sequence shown in FIG. 5.

At 602, method 600 judges whether or not there is a request to automatically stop the engine. If so, the answer is yes and method 600 proceeds to 604. Otherwise, the answer is no and method 600 exits.

At 604, method 600 adjusts the transmission clutch to a force or pressure in response to the engine stop request. In other words, the transmission clutch is adjusted to a preposition. The transmission clutch force may be retrieved from memory. In one example, the transmission clutch force is initially adjusted to a base amount and the base amount is adjusted at 620 and 628 so that force applied to by the clutch is adapted over time. Method 600 proceeds to 606 after the transmission clutch is prepositioned.

At 606, method 600 stops the engine. The engine may be stopped by deactivating spark and fuel delivered to the engine. Method 600 proceeds to 608 after the engine is stopped.

At 608, method 600 judges whether or not there is an operator request to stop the engine. If so, the answer is yes and method 600 proceeds to 610. Otherwise, the answer is no and method 600 proceeds to 612.

At 610, method 600 adjusts the clutch force the pressure plate applies to clutch discs. In one example, the preposition force from 604 is released or at least partially released so that less force is applied by the transmission clutch to couple the engine to the transmission gears. Transmission clutch force may be reduced when it is expected that the engine may be stopped for a longer period of time. Method 600 exits after the clutch preposition force is reduced.

At 612, method 600 judges whether or not there is an automatic engine start request. If so, the answer is yes and method 600 proceeds to 614. Otherwise, the answer is no and method 600 returns to 608.

At 614, method 600 cranks the engine to start. In one example, the engine is cranked via a starter motor when a pinion of the starter engages a flywheel. In other examples, motors directly coupled to the engine rotate the engine. Method 600 proceeds to 616 after engine cranking begins.

At 616, method 600 monitors battery voltage, battery current, and ambient temperature. Battery current may be monitored via measuring voltage across a shunt resistor. In one example, the battery current may be monitored when engine speed is greater than a first threshold speed and less than a second threshold speed. In one example, battery current is monitored when engine speed is at cranking speed (e.g., 200-300 RPM). In other examples, battery current may be monitored when engine speed reaches a speed where fuel and spark are reactivated. For example, battery current may be monitored when engine speed reaches an idle speed of 800 RPM when the engine is rotated up to idle speed via a motor. In such examples, the battery current is monitored between engine speeds of 750-850 RPM, for example. Battery voltage and ambient pressure are also monitored. If battery voltage is reduced to less than a threshold level the battery may be judged to be degraded and the transmission clutch is not adjusted. Method 600 proceeds to 618 after battery current monitoring begins.

At 618, method 600 judges if battery current is greater than a threshold current level. If so, the answer is yes and method 600 proceeds to 620. If not, the answer is no and method 600 proceeds to 622. Further if battery voltage is less than a threshold, method 600 proceeds to 622 whether or not battery current is greater than a threshold current.

At 620, method 600 commands a decrease in the transmission clutch application force. The transmission application force may be reduced via reducing force applied by a pressure plate to clutch discs. In other examples, hydraulic pressure supplied to actuate the clutch may be reduced. The command may adjust transmission clutch pressure during the present engine start. Additionally, the command lessens the force applied by the transmission clutch during engine cranking during a subsequent engine restart. If the engine temperature is low, the clutch application force may be increased at a reduced rate. For example, if engine temperature is low and battery current exceeds a threshold, transmission clutch application force may be reduced at a rate that is low than if engine temperature is high. The reduced decrement to transmission clutch force may be used to account for additional engine friction at lower engine temperatures that may increase battery current. Method 600 proceeds to 622 after the clutch preposition command is adjusted.

At 622, method 600 judges whether or not the engine is started or if engine speed is exceeding a threshold engine speed. If so, the answer is yes and method 600 proceeds to 624. Otherwise, the answer is no and method 600 returns to 616.

At 624, method 600 begins transferring engine torque to the vehicle wheels via increasing transmission clutch application force. The transmission clutch application force may be increased via commanding an electric motor or increasing pressure of hydraulic fluid that actuates the transmission clutch. Method 600 proceeds to 626 after increasing transfer of engine torque to vehicle wheels.

At 626, method 600 judges whether or not engine torque has been transferred to vehicle wheels at a desired rate. In one example, if the is a delay between when the transmission clutch force is increased and when additional torque is transferred to vehicle wheels, it may be determined that the transmission clutch force set during prepositioning (e.g., at time of an automatic engine stop request) is too low. If method 600 judges that engine torque is not supplied to vehicle wheels in a desired way, the answer is no and method 600 proceeds to 628. Otherwise, the answer is yes and method 600 proceeds to exit.

At 628, method 600 increases the transmission clutch preposition force request that is commanded in response to an automatic engine stop request, at 604 for example. The increase in clutch force may be stored in memory and retrieved during a subsequent engine start. In one example, the transmission clutch application force is increased by a predetermined amount, 0.5 N-m for example. Method 600 proceeds to exit after the transmission clutch force is increased.

In this way, the transmission clutch prepositioning force applied in response to an automatic engine stop request may be increased or decreased depending on battery current and torque transfer from the engine to the vehicle wheels. Thus, method 600 provides a method for operating a vehicle powertrain, comprising: adjusting a position of a clutch of a transmission in response to a battery current during cranking of an engine while starting the engine. The method includes where the clutch mechanically couples output of an engine to a layshaft of the transmission. The method also includes where the clutch is at least partially engaged and transferring torque from the engine to the layshaft.

In some examples, the method includes where the clutch is an electrically actuated clutch. The method further comprises adjusting the position of the clutch in response to battery voltage and ambient temperature. The method includes where battery current is determined via a shunt resistor. The method also includes where adjusting the position of the clutch is in response to the battery current after the engine reaches cranking speed and not in response to battery current before the engine reaches cranking speed during engine cranking.

Method 600 also provides for operating a vehicle powertrain, comprising: adjusting a clutch of a transmission to a first position in response to a request to automatically stop an engine; stopping the engine; adjusting an control parameter of the transmission in response to battery current during cranking of the engine during a first engine restart; and adjusting the clutch to a second position in response to the control parameter. The method includes where adjusting the clutch occurs during a second engine restart. The method includes where the clutch is an electrically actuated clutch. The method also includes where the clutch remains at the first position during the engine stop.

In some examples, the method includes where the control parameter is adjusted in response to battery current after the engine reaches cranking speed and not in response to battery current before the engine reaches cranking speed. The method also includes where the control parameter is adjusted to reduce clutch application pressure in response to battery current exceeding a threshold. The method also includes where the control parameter is adjusted to increase clutch application pressure in response to a transmission output torque less than a desired transmission output torque during cranking. The transferred engine torque may be measured or inferred. The method includes where the control parameter is a clutch application force, where the clutch application force is further adjusted in response to a temperature of the engine, and where clutch application force is increased at a reduced rate as the temperature of the engine decreases.

As will be appreciated by one of ordinary skill in the art, routines described in FIG. 6 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for operating a vehicle powertrain, comprising:
    adjusting a transmission clutch position in response to a battery current during engine cranking while starting an engine and in response to battery voltage and ambient temperature.

2. The method of claim 1, where a transmission clutch mechanically couples an output of an engine to a layshaft of a transmission.

3. The method of claim 2, where the transmission clutch is at least partially engaged and transfers torque from the engine to the layshaft.

4. The method of claim 2, where the transmission clutch is an electrically actuated clutch.

5. The method of claim 1, where battery current is determined via a shunt resistor.

6. The method of claim 1, where adjusting the transmission clutch position is in response to the battery current after the engine reaches cranking speed and not in response to battery current before the engine reaches cranking speed during engine cranking.

* * * * *